(12) United States Patent
Devilbiss et al.

(10) Patent No.: US 11,184,430 B2
(45) Date of Patent: *Nov. 23, 2021

(54) AUTOMATED DYNAMIC LOAD BALANCING ACROSS VIRTUAL NETWORK INTERFACE CONTROLLER FAST SWITCHOVER DEVICES USING A REBALANCER

(71) Applicant: INTERNATIONAL BUSINESS MACHINES CORPORATION, Armonk, NY (US)

(72) Inventors: Colin R. Devilbiss, Byron, MN (US); Steven E. Royer, Rochester, MN (US); Charles S. Graham, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/844,100

(22) Filed: Apr. 9, 2020

(65) Prior Publication Data
US 2020/0236161 A1    Jul. 23, 2020

Related U.S. Application Data

(63) Continuation of application No. 15/979,785, filed on May 15, 2018, now Pat. No. 10,681,117.

(51) Int. Cl.
*H04L 29/08* (2006.01)
(52) U.S. Cl.
CPC .................. *H04L 67/1002* (2013.01)
(58) Field of Classification Search
CPC ......... G06F 13/00; H04L 29/06; H04L 29/08; H04L 29/06095; H04L 29/06115;
(Continued)

(56) References Cited

U.S. PATENT DOCUMENTS 9,032,077 B1    5/2015  Klein et al.
9,154,589 B1    10/2015 Klein et al.
(Continued)

OTHER PUBLICATIONS

Anonymous, "Method and System to adjust application deployment dynamically in heterogeneous environment for workload optimization", ip.com, An IP.com Prior Art Database Technical Disclosure, IP.com No. IPCOM000223358D. IP.com Electronic Publication Date: Nov. 20, 2012, 11 pages.
(Continued)

*Primary Examiner* — Robert B Harrell
(74) *Attorney, Agent, or Firm* — Peter Edwards

(57) ABSTRACT

Automated dynamic load balancing across VNIC fast switchover devices including monitoring, by a resource monitor, resource utilization metrics of at least one resource used to send data along a first communications path through a hypervisor; in response to detecting, by the resource monitor based on the resource utilization metrics, that the at least one resource crosses a resource utilization threshold, sending a notification to a rebalancer, wherein the notification comprises a subset of the resource utilization metrics; generating, by the rebalancer based on the subset of the resource utilization metrics, a resource optimized mapping for the at least one resource used to send data along the first communications path; and issuing, by the rebalancer, the resource optimized mapping to the hypervisor, wherein the hypervisor reconfigures, based on the resource optimized mapping, the at least one resource used to send data along the first communications path.

20 Claims, 5 Drawing Sheets

(58) Field of Classification Search
 CPC ......... H04L 47/10; H04L 47/30; H04L 67/00;
       H04L 67/02; H04L 67/1002; H04L
       67/1025; H04L 67/1008
 USPC ........................................................ 709/235
 See application file for complete search history.

(56) References Cited

U.S. PATENT DOCUMENTS

| | | | |
|---|---|---|---|
| 9,378,068 | B2 | 6/2016 | Anantharam et al. |
| 9,459,904 | B2 | 10/2016 | Mehta et al. |
| 2009/0300605 | A1 | 12/2009 | Edwards et al. |
| 2012/0102258 | A1 | 4/2012 | Hepkin et al. |
| 2012/0151472 | A1 | 6/2012 | Koch et al. |
| 2013/0138863 | A1 | 5/2013 | Tsirkin et al. |
| 2014/0025770 | A1 | 1/2014 | Warfield et al. |
| 2015/0263987 | A1 | 9/2015 | Klein et al. |
| 2019/0356728 | A1 | 11/2019 | DeVilbiss et al. |

OTHER PUBLICATIONS

Anonymous, "System and Method for Determining Resource Monitoring Thresholds Base on Workload and Performance", ip.com, An IP.com Prior Art Database Technical Disclosure, IP.com No. IPCOM000228218D, IP.com Electronic Publication Date: Jun. 13, 2013, 3 pages.

Anonymous, "System and Method to Predict and Dynamically Adjust the Allocation of Resources for Cloud", ip.com, An IP.com Prior Art Database Technical Disclosure, IP.com No. IPCOM000225612D, IP.com Electronic Publication Date: Feb. 21, 2013, 9 pages.

Anonymous, "System and methods to efficiently manage workload patters in the Cloud", ip.com, An IP.com Prior Art Database Technical Disclosure, IP.com No. IPCOM000225221D, IP.com Electronic Publication Date: Jan. 31, 2013, 7 pages.

Cisco, "Network Automation for Cloud—Practical Overview", White Paper, Feb. 2014, 24 pages, Cisco Systems, Inc., San Jose, CA.

IBM Appendix P., "List of IBM Patents or Patent Applications to be Treated as Related", Dated Herewith, 2 pages.

Zhang et al., "Load Balancing of Heterogeneous Workloads in Memcached Clusters", 2014 USENIX Federated Conferences Week, 9th International Workshop of Feedback Computing, URL: https://webcache.googleusercontent.com/search?q=cache:AVOHwRLDreYJ:https://pdfs.semanticscholar.org/98ad/1a18d4cb0839b114300279198cf2d8a03a2d.pdf+&cd=2&hl=en&ct=clnk&gl=us&client=firefox-b-1-ab, Jun. 2014, 8 pages.

AUTOMATED DYNAMIC LOAD BALANCING ACROSS VIRTUAL NETWORK INTERFACE CONTROLLER FAST SWITCHOVER DEVICES USING A REBALANCER

CROSS-REFERENCE TO RELATED APPLICATIONS

This application is a continuation application of and claims priority from U.S. patent application Ser. No. 15/979,785, filed May 15, 2018 which is now U.S. Pat. No. 10,681,117 B2.

BACKGROUND

Field of the Invention

The field of the invention is data processing, or, more specifically, methods, apparatus, and products for automated dynamic load balancing across VNIC fast switchover devices.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for automated dynamic load balancing across virtual network interface controller (VNIC) fast switchover devices are disclosed in this specification. Automated dynamic load balancing across VNIC fast switchover devices includes monitoring, by a resource monitor, resource utilization metrics of at least one resource used to send data along a first communications path through a hypervisor, wherein the first communications path is utilized by a first client partition and comprises a VNIC client in the first client partition, a VNIC server in a virtual input/output (I/O) server, a logical port in the virtual I/O server, and a communications adapter; in response to detecting, by the resource monitor based on the resource utilization metrics, that the at least one resource crosses a resource utilization threshold, sending a notification to a rebalancer that the at least one resource has exceeded the resource utilization threshold, wherein the notification comprises a subset of the resource utilization metrics; generating, by the rebalancer based on the subset of the resource utilization metrics, a resource optimized mapping for the at least one resource used to send data along the first communications path; and issuing, by the rebalancer, the resource optimized mapping to the hypervisor, wherein the hypervisor reconfigures, based on the resource optimized mapping, the at least one resource used to send data along the first communications path.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
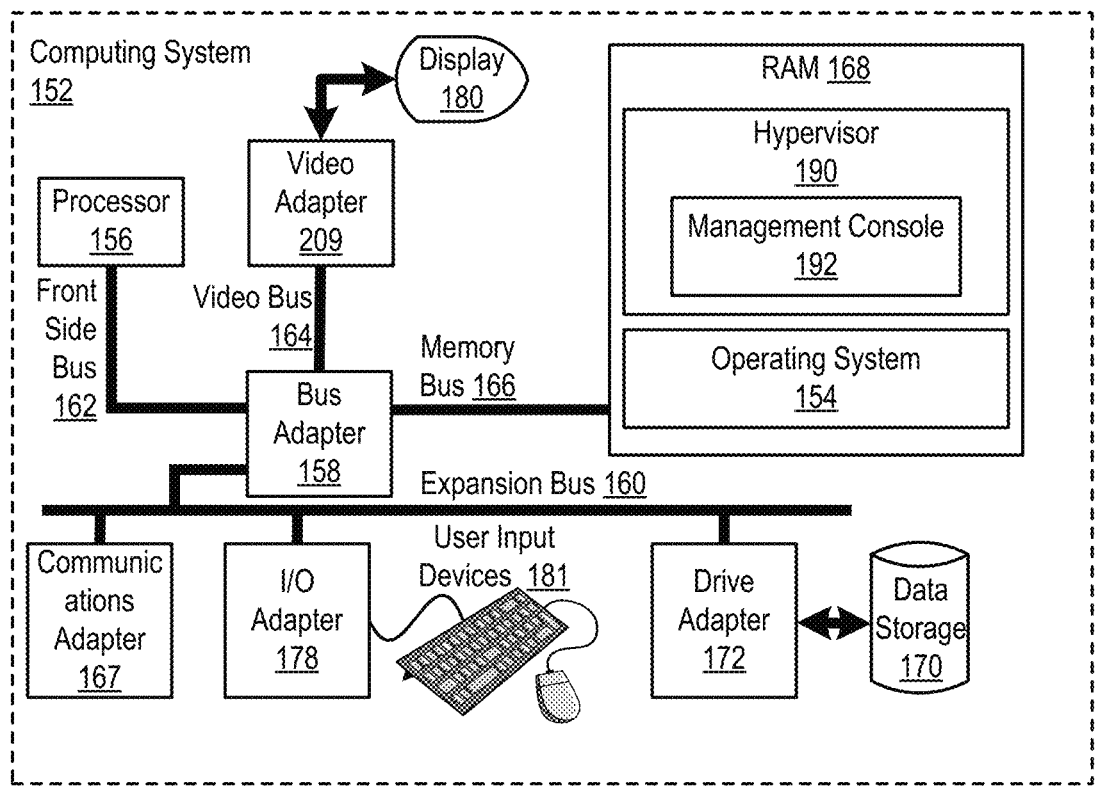
FIG. 1 sets forth a block diagram of an example system configured for automated dynamic load balancing across VNIC fast switchover devices according to embodiments of the present invention.

Exemplary methods, apparatus, and products for automated dynamic load balancing across VNIC fast switchover devices in accordance with the present invention are described with reference to the accompanying drawings, beginning with FIG. 1. FIG. 1 sets forth a block diagram of automated computing machinery comprising an exemplary computing system (152) configured for automated dynamic load balancing across VNIC fast switchover devices according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154). Operating systems useful in computers configured for automated dynamic load balancing across VNIC fast switchover devices according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM is a hypervisor (190) that includes a management console (192).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for automated dynamic load balancing across VNIC fast switchover devices according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for automated dynamic load balancing across VNIC fast switchover devices according to embodiments of the present invention include modems for wired dial-up communications, Ethernet (IEEE 802.3) adapters for wired data communications, and 802.11 adapters for wireless data communications.

Figure 2:
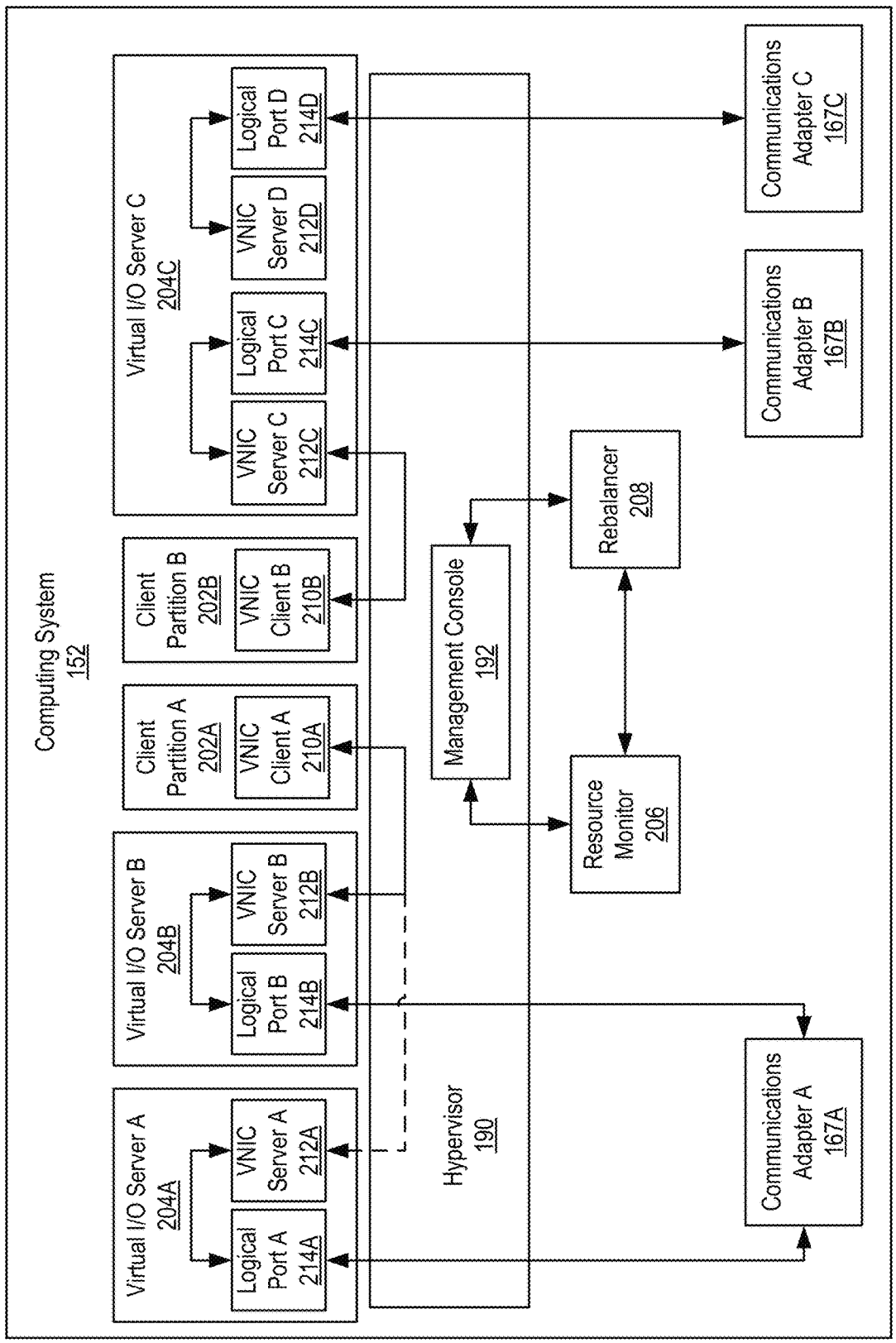
FIG. 2 sets forth a block diagram of an example system configured for automated dynamic load balancing across VNIC fast switchover devices according to embodiments of the present invention.

FIG. 2 shows an exemplary system for automated dynamic load balancing across VNIC fast switchover devices according to embodiments of the present invention. As shown in FIG. 2, the exemplary computing system (152) includes multiple client partitions (client partition A (202A), client partition B (202B)) and multiple virtual input/output (I/O) servers (virtual I/O server A (204A), virtual I/O server B (204B), virtual I/O server C (204C)) hosted by a hypervisor (190). The computing system (152) also includes a resource monitor (206), a rebalancer (208), and multiple communications adapters (communications adapter A (167A), communications adapter B (167B), communications adapter C (167C)). Each client partition (client partition A (202A), client partition B (202B)) includes a virtual network interface controller (VNIC) client (VNIC client A (210A), VNIC client B (210B)), and each virtual I/O server (virtual I/O server A (204A), virtual I/O server B (204B), virtual I/O server C (204C)) includes at least one VNIC server (VNIC server A (212A), VNIC server B (212B), VNIC server C (212C), VNIC server D (212D)) and at least one logical port (logical port A (214A), logical port B (214B), logical port C (214C), logical port D (214D)). The hypervisor includes a management console (192).

Each client partition (client partition A (202A), client partition B (202B)) is an aggregation of hardware and software configured to send and receive data in the form of data packets using a VNIC client (VNIC client A (210A), VNIC client B (210B)). Each client partition may be an isolated execution environment accessible and configurable by a client. Each client partition may be assigned a subset of the hardware resources of the computing system (152), such as processor and memory resources. Each client partition may be referred to as virtual machine or logical partition.

Each VNIC client (VNIC client A (210A), VNIC client B (210B)) is an aggregation of hardware and software capable of sending and receiving data (e.g., in the form of data packets) or data pointers. Each client partition interacts with a VNIC client as a virtual device configured to operate as a network interface controller for the client partition.

Each virtual I/O server (virtual I/O server A (204A), virtual I/O server B (204B), virtual I/O server C (204C)) is an aggregation of hardware and software configured to host at least one VNIC server and at least one logical port. Each virtual I/O server may be an isolated execution environment configurable by the hypervisor (190). Each virtual I/O server may be assigned a subset of the hardware resources of the computing system (152), such as processor and memory resources. Each virtual I/O server may be referred to as virtual machine or logical partition.

Each VNIC server (VNIC server A (212A), VNIC server B (212B), VNIC server C (212C), VNIC server D (212D)) is an aggregation of hardware and software capable of interacting with a VNIC client and logical port to send and receive data (e.g., in the form of data packets) or data pointers. Each VNIC server may receive data from a logical port, prepare the data for transmission to a VNIC client, and transmit the data to the VNIC client via the hypervisor (190). Each VNIC server may also receive data from a VNIC client via the hypervisor (190), prepare the data for a logical port, and provide the data to the logical port.

Each VNIC client (VNIC client A (210A), VNIC client B (210B)) is communicatively coupled to one VNIC server (VNIC server A (212A), VNIC server B (212B), VNIC server C (212C), VNIC server D (212D)) at a time. In the event of a failure of the VNIC server or rebalancing, the VNIC client may be associated with a different VNIC server (i.e., switched over to the new VNIC server). As shown in the exemplary system of FIG. 2, VNIC client A (210A) is communicatively coupled to VNIC server B (212B). However, in the event of a failure of VNIC server B (212B), VNIC client A (210A) will automatically be switched over to VNIC server A (212A) by the hypervisor (190).

The virtual I/O server hosting the VNIC server currently communicatively coupled to the VNIC client is referred to as the active virtual I/O server for the VNIC client and the client partition. Similarly, the VNIC server currently communicatively coupled to the VNIC client is referred to as the active VNIC server for the VNIC client and the client partition. The virtual I/O server hosting the VNIC server not currently communicatively coupled to the VNIC client but that will be communicatively coupled to the VNIC client in the event of a rebalancing or failure is referred to as the standby virtual I/O server for the VNIC client and the client partition. Similarly, the VNIC server not currently communicatively coupled to the VNIC client but that will be communicatively coupled to the VNIC client in the event of a rebalancing or failure is referred to as the standby VNIC server for the VNIC client and the client partition A.

Therefore, as shown in exemplary FIG. 2, virtual I/O server B (204B) is the active virtual I/O server for client partition A (202A) and VNIC client A (210A), and VNIC server B (212B) is the active VNIC server for client partition A (202A) and VNIC client A (210A). Virtual I/O server A (204A) is the standby virtual I/O server for client partition A (202A) and VNIC client A (210A), and VNIC server A (212A) is the standby VNIC server for client partition A (202A) and VNIC client A (210A). Virtual I/O server C (204C) is the active virtual I/O server for client partition B (202B) and VNIC client B (210B), and VNIC server C (212C) is the active VNIC server for client partition B (202B) and VNIC client B (210B). VNIC server D (212D) is unassigned but may be assigned as an active or standby VNIC server for VNIC client A (210A) or VNIC client B (210B).

Each logical port (logical port A (214A), logical port B (214B), logical port C (214C), logical port D (214D)) is an aggregation of hardware and software capable of interacting with a VNIC server and communications adapter to send and receive data (e.g., in the form of data packets) or data pointers. Each logical port may receive data from a communications adapter, prepare the data for a VNIC server, and send the data to the VNIC server. Each logical port may also receive data from a VNIC server, prepare the data for a communications adapter, and transmit the data to the communications adapter via the hypervisor (190). Each logical port may be a virtual function associated with a physical function of a single root I/O virtualization (SR-I/OV) communication adapter.

Each communications adapter (communications adapter A (167A), communications adapter B (167B), communications adapter C (167C)) is an aggregation of hardware and software capable of interacting with one or more logical ports to receive data from and transmit data over a communications medium (not shown), such as a network or interconnect. Each communications adapter may receive data (e.g., in the form of data packets) or data pointers from a logical port, prepare the data for transmission over a communications medium, and transmit the data over the communications medium. Each communication adapter may also receive data from a communications medium, prepare the data for a logical port, and transmit the data (or data pointers) to the logical port via the hypervisor (190). Each communications adapter may be communicatively coupled to one or more logical ports, and may be a SR-IOV communications adapter.

The hypervisor (190) is an aggregation of hardware and software that manages resources on the computing system (152). A resource is a hardware or software element used to move data along a communications path. Software resources include virtual devices such as client partitions, VNIC clients, VNIC servers, logical ports, and virtual I/O servers. Hardware resources include communications adapters (e.g., SR-IOV physical functions, network interface controllers), processors (or portions of processors), memory (or portions of memory), storage (or portions of storage) and physical connections such as interconnect lanes (e.g., peripheral component interconnect (PCI) lanes). Some, but not all, resources managed by the hypervisor move data along a communications path.

The hypervisor instantiates and monitors the client partitions and virtual I/O servers on the computing system (152). The hypervisor also establishes communications paths between VNIC clients, VNIC servers, logical ports, and communications adapters. The hypervisor (190) further directs data communications between each VNIC client and an associated VNIC server, and between the logical ports and the communications adapters.

The hypervisor (190) further maintains information about backing devices for each VNIC server. A backing device is a resource that maps onto a logical port. For example, a virtual I/O server hosting a logical port may require processing resources and memory resources to carry out the functions of the virtual I/O server hosting the logical port. In this case, the processing resources and memory resources are the backing devices for the logical port and virtual I/O server. As another example, communications pathways including interconnect lanes may also be backing devices for a logical port.

The hypervisor (190) also maintains affinity information about resources. Affinity information is information about the physical and communicative proximity between two resources. For example, processor A and memory A may be in close proximity to each other on the computing system resulting in low communication latency. Processor C may be physically further from processor A and memory A with relatively higher communication latency with processor A and memory A. In this example, processor A and memory A have a strong affinity and processor B and memory A have a weaker affinity. Hardware resources that frequently communicate with one another operate more efficiently if those hardware resources share a strong affinity.

The management console (192) is an aggregation of hardware and software that provides an interface with the hypervisor. Other elements on the computing system, such as the resource monitor (206) and the rebalancer (208) retrieve or are otherwise provided information from the hypervisor via the management console. Further, other elements on the computing system may also effect change to the system by providing instructions, such as resource optimized mappings, to the hypervisor via the management console. Although FIG. 1 and FIG. 2 depict the management console (192) as within the hypervisor (190), the management console may be an entity separate and distinct from the hypervisor and communicatively coupled to the hypervisor.

The resource monitor (206) is an aggregation of hardware and software that monitors resource utilization metrics and generates notifications in response to one or more resource utilization metrics crossing a resource utilization threshold. Resource utilization metrics are measurements of an amount of a resource in active use at a point in time. Resource utilization metrics may be expressed as, for example, a percent of available resource in active use (e.g., percent of CPU used, percent of memory used, percent of storage used) or the rate of requests being serviced (e.g., rate of data packets serviced by a VNIC client, rate of data packets serviced by a communications adapter, rate of data sent on a section of interconnect). A resource utilization threshold is a particular level of resource utilization above or below which indicates over- or under-utilization of that resource.

The rebalancer (208) an aggregation of hardware and software that receives notifications from the resource monitor (206), generates resource optimized mappings based on the notifications, and issues the resource optimized mappings to the hypervisor. The rebalancer may receive a subset of resource utilization metrics from the resource monitor (206) or the hypervisor (190) via the management console (192). Although the resource monitor (206) and the rebalancer (208) are shown external to the hypervisor (190), the resource monitor (206) and the rebalancer (208) may be part of the hypervisor (190).

In generating resource optimized mappings and issuing the resource optimized mappings to the hypervisor, the rebalancer (208) performs dynamic load balancing. Load balancing refers to adding, removing, or replacing resources in a communications path to utilize the available resources toward a system goal, such as efficiency or throughput. Dynamic load balancing refers to adding, removing, or replacing resources without significant disruption to activities on the client partitions and with minimum system impact.

A communications path is a collection of resources used to transfer data between a communications adapter (communications adapter A (167A), communications adapter B (167B), communications adapter C (167C)) and a VNIC client (VNIC client A (210A), VNIC client B (210B)). A communications path is made up of resources that support the transfer of data between the communications adapter and the VNIC client. Such resources may include the communications adapter, the logical port, the VNIC server, and the VNIC client. Resources that make up a communications path also include backing devices for the virtual devices and backing devices for communication paths through the hypervisor. The resource monitor (206) and/or the rebalancer (208) may maintain information about which resources are shared among different communication paths.

Each communication path is used to send data with minimal overhead. Data pointers may be transferred between each resource in the communication path, and the data may be sent and received between the communication adapter and VNIC client without inspecting the data within each packet, reducing system overhead.

Each VNIC server (VNIC server A (212A), VNIC server B (212B), VNIC server C (212C), VNIC server D (212D)) may have an associated priority. The VNIC server priority indicates which VNIC server is an active VNIC server for a client partition and VNIC client, and which VNIC server or servers are standby VNIC server for the client partition and VNIC client. The VNIC server with the highest priority may be designated the active VNIC server and a communications path may be created for the client partition and VNIC client using the active VNIC server. If the active VNIC server fails, or if the priorities are altered, the currently available VNIC server with the highest priority is made the active VNIC server. The collection of virtual devices utilizing prioritized VNIC servers are referred to as VNIC fast switchover devices. The VNIC server failover configuration is the configuration of virtual devices and priorities assigned to each VNIC server.

Figure 3:
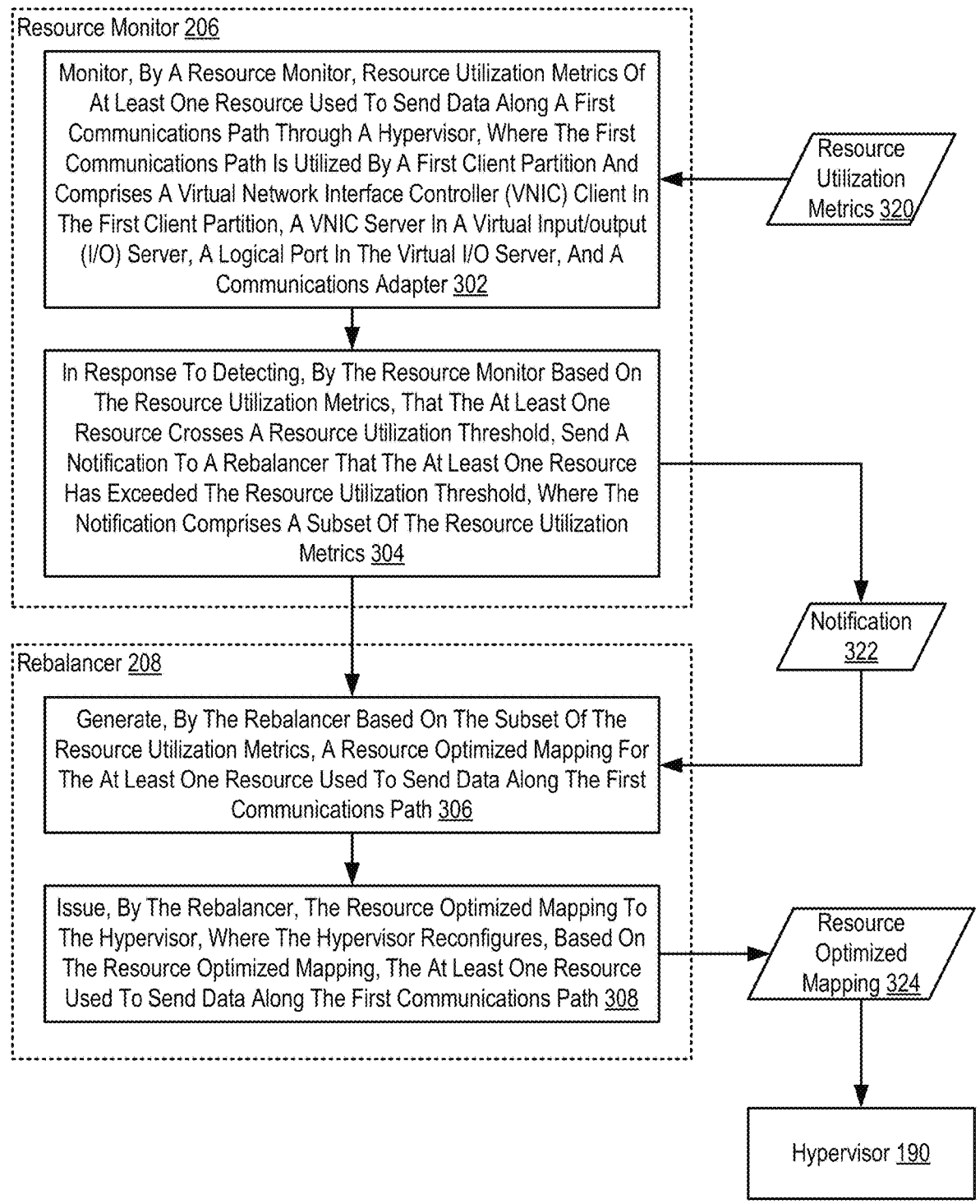
FIG. 3 sets forth a flow chart illustrating an exemplary method for automated dynamic load balancing across VNIC fast switchover devices according to embodiments of the present invention.

For further explanation, FIG. 3 sets forth a flow chart illustrating an exemplary method for automated dynamic load balancing across VNIC fast switchover devices according to embodiments of the present invention that includes monitoring (302), by a resource monitor (206), resource utilization metrics (320) of at least one resource used to send data along a first communications path through a hypervisor (190), wherein the first communications path is utilized by a first client partition and comprises a virtual network interface controller (VNIC) client in the first client partition, a VNIC server in a virtual input/output (I/O) server, a logical port in the virtual I/O server, and a communications adapter. Monitoring (302), by a resource monitor (206), resource utilization metrics (320) of at least one resource used to send data along a first communications path through a hypervisor (190), wherein the first communications path is utilized by a first client partition and comprises a virtual network interface controller (VNIC) client in the first client partition, a VNIC server in a virtual input/output (I/O) server, a logical port in the virtual I/O server, and a communications adapter may be carried out by the resource monitor (206) querying the management console of the hypervisor (190) to retrieve resource utilization metrics (320) about one resource or a plurality of resources in the communications path. The resource monitor may also receive asynchronous updates from the management console for each resource utilization metric.

For example, the resource monitor (206) may receive resource utilization metrics for a communication path that includes resource utilization metrics for the communications adapter (such as the rate of incoming and outgoing data handled by the communications adapter), the logical port (such as the rate of incoming and outgoing data handled by the logical port, the percentage of assigned processing resources used, and the percentage of memory resources used), the VNIC server (such as the rate of incoming and outgoing data handled by the VNIC server, the percentage of assigned processing resources used, and the percentage of memory resources used), the virtual I/O server (such as the overall rate of all incoming and outgoing data handled by the virtual I/O server by each VNIC server and logical port on the virtual I/O server, the percentage of assigned processing resources used, and the percentage of memory resources used), and the VNIC client (such as the percentage of assigned processing resources used, and the percentage of memory resources used).

The monitored resource or resources may be shared by more than one communications path. Specifically, the resource may be used by a second communications path utilized by a second client partition. For example, two communications paths may use different logical ports and VNIC servers on the same virtual I/O server, two logical ports may be communicatively coupled to the same communications adapter, or two communications paths may utilize the same segment of a PCI bus. As another example, virtual devices within each of the two communications paths may be backed by the same hardware resource, such as a processor or pool of memory.

The method of FIG. 3 further includes in response to detecting (304), by the resource monitor (206) based on the resource utilization metrics (320), that the at least one resource crosses a resource utilization threshold, sending a notification (322) to a rebalancer (208) that the at least one resource has exceeded the resource utilization threshold, wherein the notification (322) comprises a subset of the resource utilization metrics. Detecting (304), by the resource monitor (206) based on the resource utilization metrics (320), that the at least one resource crosses a resource utilization threshold may be carried out by the resource monitor (206) comparing the resource utilization metric(s) to one or more resource utilization thresholds and determining that the resource utilization metric has either exceeded or fallen below a resource utilization threshold.

Sending a notification (322) to a rebalancer (208) that the at least one resource has exceeded the resource utilization threshold, wherein the notification (322) comprises a subset of the resource utilization metrics may be carried out by the resource monitor generating the notification identifying the resource in need of rebalancing and including a portion of the resource utilization metrics. The subset of resource utilization metrics may include resource utilization metrics relevant to generating the resource optimized mapping (324). The resource utilization metrics relevant to generating the resource optimized mapping (324) may be the most recent resource utilization metrics for the resource(s).

The method of FIG. 3 further includes generating (306), by the rebalancer (208) based on the subset of the resource utilization metrics, a resource optimized mapping (324) for the at least one resource used to send data along the first communications path. Generating (306), by the rebalancer (208) based on the subset of the resource utilization metrics, a resource optimized mapping (324) for the at least one resource used to send data along the first communications path may be carried out by the rebalancer (208) determining a resource optimized mapping for the given subset of resource utilization metrics and other information about the state of the computing system. The rebalancer may generate the resource optimized mapping by using the subset of resource utilization metrics as a key into a collection of predetermined resource optimized mappings.

A resource optimized mapping (324) is a set of instructions for the hypervisor that alters the resources for the communications path to prevent resource utilization metrics associated with the resource from crossing a resource utilization threshold for the current state of the computing system. The resource optimized mapping may include alterations to both a virtual device and a hardware resource. Altering virtual devices may include creating, combining, or eliminating virtual devices. Altering hardware resources may include adding or removing hardware resources from the communications path or from backing virtual devices in the communications path.

The set of instructions may be instructions to add an additional resource to the first communications path or an instruction to replace the resource with a second resource. Adding an additional resource to the first communications path may include adding additional hardware resources to the currently assigned hardware resources backing a virtual device. For example, additional processing resources or memory resources may be assigned to a virtual I/O server. Adding an additional resource to the first communications path may also include generating a virtual device, such as a virtual I/O server, and adding that virtual device to the communications path as an active or standby virtual I/O server. Adding an additional resource to the first communications path may also include adding underutilized resources from a second communications path or unused resources from a resource pool.

Replacing the resource with a second resource may include switching a virtual device in the communications path with an underutilized virtual device from another communications path, or with a virtual device not in use from a pool of unused virtual devices. Replacing the resource with a second resource may also include replacing a logical port associated with the communications adapter with a second logical port associated with a second communications adapter. Replacing the resource with a second resource may also include altering the virtual I/O configuration of the computing system, such as by replacing a virtual I/O server in the communications path with an existing standby virtual I/O server, replacing a single active virtual I/O server used for two client partitions with separate active virtual I/O servers for each client partition, and combining two active virtual I/O server used for two client partitions with a single active virtual I/O servers for both client partitions, The resource optimized mapping may include instructions to alter a VNIC server failover configuration. The VNIC server failover configuration identifies a backup VNIC server for use in response to a failure of the VNIC server. Altering a VNIC server failover configuration may include reordering the priority of each VNIC server for a client partition or partitions. Specifically, the priority of each VNIC server may be altered by raising or lowering a priority of the VNIC server to change which VNIC server are the active and standby VNIC server for a client partition.

In generating the resource optimized mapping, the rebalancer may account for future failures and assign active and standby devices accordingly. Specifically, in generating the resource optimized mapping, the rebalancer may anticipate multiple failures and types of failures, and generate a resource optimized mapping that prevents overloading of a single resource or set of resources in the event of multiple failures. For example, the resource optimized mapping may avoid having two client partitions utilize the same first standby virtual I/O server. In the event that both active virtual I/O servers fail for each client partition, if both client partitions are assigned the same standby virtual I/O server, then an additional failure (e.g., a detected crossing of a resource utilization metric associated with the virtual I/O server) may be highly likely.

The method of FIG. 3 further includes issuing (308), by the rebalancer (208), the resource optimized mapping (324) to the hypervisor (190), wherein the hypervisor (190) reconfigures, based on the resource optimized mapping (324), the at least one resource used to send data along the first communications path. Issuing (308), by the rebalancer (208), the resource optimized mapping (324) to the hypervisor (190), wherein the hypervisor (190) reconfigures, based on the resource optimized mapping (324), the at least one resource used to send data along the first communications path may be carried out by the rebalancer issuing the resource optimized mapping (324) to the hypervisor (190) via the management console. The hypervisor may, in response, implement the instructions within the resource optimized mapping (324).

The above limitations improve the operation of the computer system by monitoring and rebalancing resources in a system hosting client partitions and virtual I/O servers to achieve computing system goals such as improved efficiency or throughput. Specifically, in computing systems that host multiple client partitions and virtual I/O servers, rebalancing both software resources such as virtual devices and resources for the virtual devices and communications paths enables a robust reconfiguration of the computing system for improved efficiency and/or throughput as compared with only rebalancing the software resources.

Figure 4:
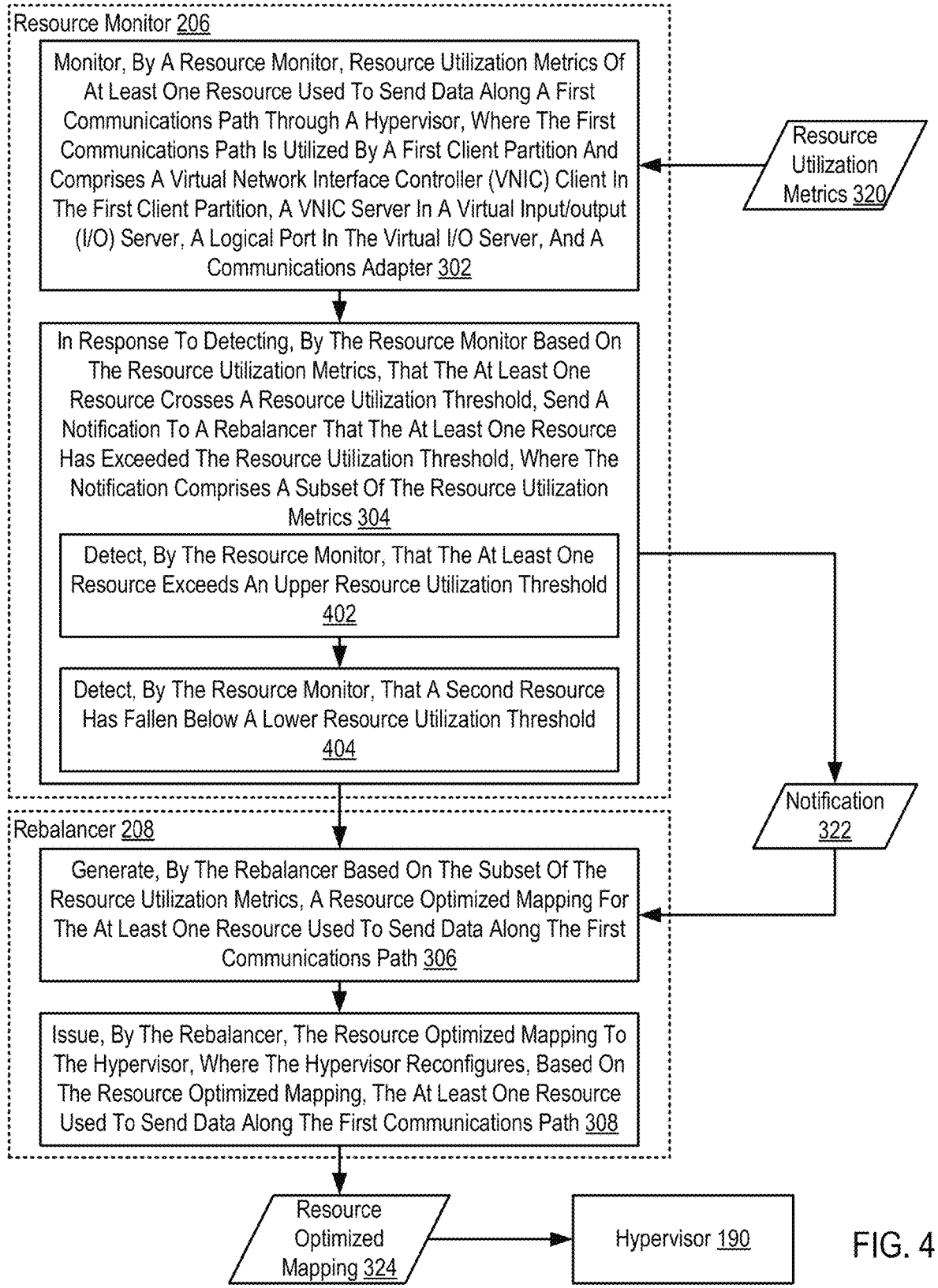
FIG. 4 sets forth a flow chart illustrating an exemplary method for automated dynamic load balancing across VNIC fast switchover devices according to embodiments of the present invention.

For further explanation, FIG. 4 sets forth a flow chart illustrating a further exemplary method for automated dynamic load balancing across VNIC fast switchover devices according to embodiments of the present invention that includes monitoring (302), by a resource monitor (206), resource utilization metrics (320) of at least one resource used to send data along a first communications path through a hypervisor (190), wherein the first communications path is utilized by a first client partition and comprises a virtual network interface controller (VNIC) client in the first client partition, a VNIC server in a virtual input/output (I/O) server, a logical port in the virtual I/O server, and a communications adapter; in response to detecting, by the resource monitor (206) based on the resource utilization metrics (320), that the at least one resource crosses a resource utilization threshold, sending a notification (322) to a rebalancer (208) that the at least one resource has exceeded the resource utilization threshold, wherein the notification (322) comprises a subset of the resource utilization metrics; generating (306), by the rebalancer (208) based on the subset of the resource utilization metrics, a resource optimized mapping (324) for the at least one resource used to send data along the first communications path; and issuing (308), by the rebalancer (208), the resource optimized mapping (324) to the hypervisor (190), wherein the hypervisor (190) reconfigures, based on the resource optimized mapping (324), the at least one resource used to send data along the first communications path.

The method of FIG. 4 differs from the method of FIG. 3, however, in that in response to detecting, by the resource monitor (206) based on the resource utilization metrics (320), that the at least one resource crosses a resource utilization threshold, sending a notification (322) to a rebalancer (208) that the at least one resource has exceeded the resource utilization threshold, wherein the notification (322) comprises a subset of the resource utilization metrics includes detecting (402), by the resource monitor (206), that the at least one resource exceeds an upper resource utilization threshold; and detecting (404), by the resource monitor (206), that a second resource has fallen below a lower resource utilization threshold.

Detecting (402), by the resource monitor (206), that the at least one resource exceeds an upper resource utilization threshold may be carried out by comparing the resource utilization metrics for the at least one resource to an upper resource utilization threshold and determining that the resource utilization metrics for the at least one resource are greater than the upper resource utilization threshold. Detecting (404), by the resource monitor (206), that a second resource has fallen below a lower resource utilization threshold may be carried out by comparing the resource utilization metrics for the second resource to a lower resource utilization threshold and determining that the resource utilization metrics for the second resource are below the lower resource utilization threshold.

Some resource optimized mappings may be selected only if one resource is overutilized and another resource is underutilized. For example, if one virtual I/O server is overutilized, and another virtual I/O server is underutilized, one of the client partitions using the overutilized virtual I/O server as an active virtual I/O server may be reassigned to use the underutilized virtual I/O server as the active virtual I/O server. Similarly, if the portion of memory assigned to a first VNIC server is overutilized and the portion of memory assigned to a second VNIC server is underutilized, part of the portion of memory assigned to the second VNIC server may be reassigned to the first VNIC server.

Figure 5:
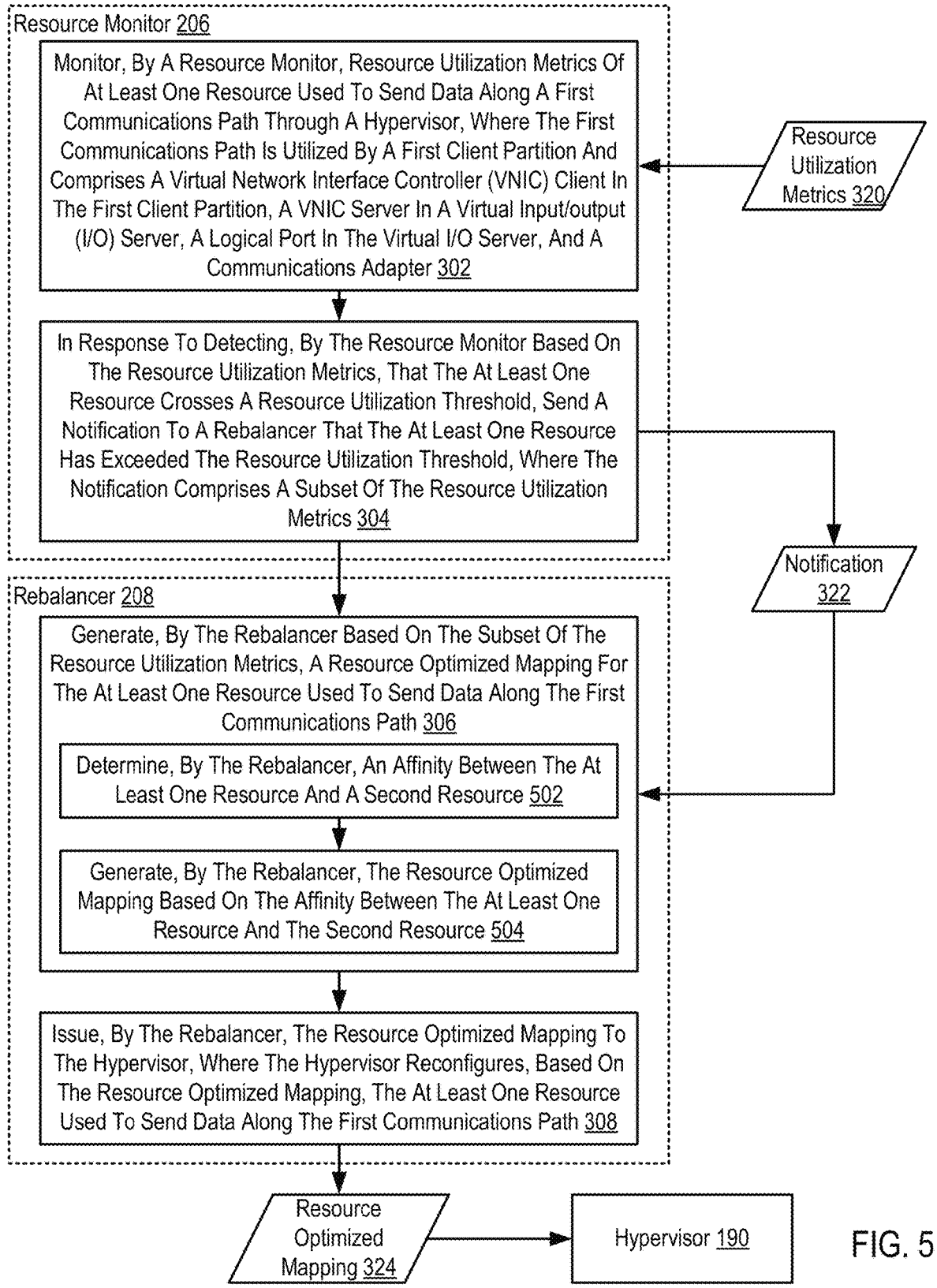
FIG. 5 sets forth a flow chart illustrating an exemplary method for automated dynamic load balancing across VNIC fast switchover devices according to embodiments of the present invention.

For further explanation, FIG. 5 sets forth a flow chart illustrating a further exemplary method for automated dynamic load balancing across VNIC fast switchover devices according to embodiments of the present invention that includes monitoring (302), by a resource monitor (206), resource utilization metrics (320) of at least one resource used to send data along a first communications path through a hypervisor (190), wherein the first communications path is utilized by a first client partition and comprises a virtual network interface controller (VNIC) client in the first client partition, a VNIC server in a virtual input/output (I/O) server, a logical port in the virtual I/O server, and a communications adapter; in response to detecting, by the resource monitor (206) based on the resource utilization metrics (320), that the at least one resource crosses a resource utilization threshold, sending a notification (322) to a rebalancer (208) that the at least one resource has exceeded the resource utilization threshold, wherein the notification (322) comprises a subset of the resource utilization metrics; generating (306), by the rebalancer (208) based on the subset of the resource utilization metrics, a resource optimized mapping (324) for the at least one resource used to send data along the first communications path; and issuing (308), by the rebalancer (208), the resource optimized mapping (324) to the hypervisor (190), wherein the hypervisor (190) reconfigures, based on the resource optimized mapping (324), the at least one resource used to send data along the first communications path.

The method of FIG. 5 differs from the method of FIG. 3, however, in that generating (306), by the rebalancer (208) based on the subset of the resource utilization metrics, a resource optimized mapping (324) for the at least one resource used to send data along the first communications path includes determining (502), by the rebalancer (208), an affinity between the at least one resource and a second resource; and generating (504), by the rebalancer (208), the resource optimized mapping (324) based on the affinity between the at least one resource and the second resource.

Determining (502), by the rebalancer (208), an affinity between the at least one resource and a second resource may be carried out by the rebalancer (208) maintaining affinity information between each monitored resource or by retrieving affinity information from the resource monitor or hypervisor. The affinity may indicate a physical and communicative proximity between the at least one resource and the second resource.

Generating (504), by the rebalancer (208), the resource optimized mapping (324) based on the affinity between the at least one resource and the second resource may be carried out by including instructions in the resource optimized mapping (324) that place resources with a relatively strong affinity within the same communications path, and resources with a relatively weak affinity within different communications paths.

In view of the explanations set forth above, readers will recognize that the benefits of automated dynamic load balancing across VNIC fast switchover devices according to embodiments of the present invention include:

Improving the operation of a computing system by monitoring and rebalancing resources at multiple resource levels, including software resources and hardware resources backing virtual devices, increasing computing system efficiency and throughput.

Improving the operation of a computing system by monitoring and rebalancing resources without imposing additional data packet processing, increasing computing system efficiency.

Improving the operation of a computing system by monitoring and rebalancing resources with consideration for the consequences of multiple failures, increasing computing system efficiency in the event of such a failure.

Improving the operation of a computing system by monitoring and rebalancing resources with insight into resource utilization, allowing for dynamic improvements to resource utilization, increasing computing system efficiency.

Exemplary embodiments of the present invention are described largely in the context of a fully functional computer system for automated dynamic load balancing across VNIC fast switchover devices. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of automated dynamic load balancing across virtual network interface controller (VNIC) fast switchover devices, the method comprising:
   receiving, by a rebalancer, a notification that at least one resource used to send data along a first communications path through a hypervisor has exceeded a resource utilization threshold, the notification including at least one resource utilization metric, wherein the first communications path is utilized by a first client partition and comprises at least a VNIC client in the first client partition;
   generating, by the rebalancer based on at least one resource utilization metric, a resource optimized mapping for the at least one resource used to send data along the first communications path; and
   issuing, by the rebalancer, the resource optimized mapping to the hypervisor, wherein the hypervisor reconfigures, based on the resource optimized mapping, the at least one resource used to send data along the first communications path.

2. The method of claim 1, wherein the at least one resource is shared by a second communications path utilized by a second client partition.

3. The method of claim 1, wherein the resource optimized mapping for the at least one resource used to send data along the first communications path comprises one selected from a group consisting of: an instruction to add an additional resource to the first communications path, and an instruction to replace the at least one resource with a second resource.

4. The method of claim 1, further comprising detecting, by a resource monitor, that the at least one resource crosses the resource utilization threshold including:
   detecting, by the resource monitor, that the at least one resource exceeds an upper resource utilization threshold; and
   detecting, by the resource monitor, that a second resource has fallen below a lower resource utilization threshold.

5. The method of claim 1, wherein generating, by the rebalancer based on the at least one resource utilization metric, the resource optimized mapping for the at least one resource used to send data along the first communications path comprises:
   determining, by the rebalancer, an affinity between the at least one resource and a second resource; and
   generating, by the rebalancer, the resource optimized mapping based on the affinity between the at least one resource and the second resource.

6. The method of claim 1, wherein the resource optimized mapping comprises instructions to alter a VNIC server failover configuration, wherein the VNIC server failover configuration identifies a backup VNIC server for use in response to a failure of the VNIC server.

7. The method of claim 1, wherein the at least one resource comprises one selected from a group consisting of: a logical port, a communications adapter, a VNIC server, a virtual I/O server, processing resources, and memory resources.

8. An apparatus for automated dynamic load balancing across virtual network interface controller (VNIC) fast switchover devices, the apparatus comprising a computer processor, a computer memory operatively coupled to the computer processor, the computer memory having disposed within it computer program instructions that, when executed by the computer processor, cause the apparatus to carry out the steps of:
   receiving, by a rebalancer, a notification that at least one resource used to send data along a first communications path through a hypervisor has exceeded a resource utilization threshold, the notification including at least one resource utilization metric, wherein the first communications path is utilized by a first client partition and comprises at least a VNIC client in the first client partition;
   generating, by the rebalancer based on at least one resource utilization metric, a resource optimized mapping for the at least one resource used to send data along the first communications path; and
   issuing, by the rebalancer, the resource optimized mapping to the hypervisor, wherein the hypervisor reconfigures, based on the resource optimized mapping, the at least one resource used to send data along the first communications path.

9. The apparatus of claim 8, wherein the at least one resource is shared by a second communications path utilized by a second client partition.

10. The apparatus of claim 8, wherein the resource optimized mapping for the at least one resource used to send data along the first communications path comprises one selected from a group consisting of: an instruction to add an additional resource to the first communications path, and an instruction to replace the at least one resource with a second resource.

11. The apparatus of claim 8, further comprising detecting, by a resource monitor, that the at least one resource crosses the resource utilization threshold including:
   detecting, by the resource monitor, that the at least one resource exceeds an upper resource utilization threshold; and
   detecting, by the resource monitor, that a second resource has fallen below a lower resource utilization threshold.

12. The apparatus of claim 8, wherein generating, by the rebalancer based on the at least one resource utilization metric, the resource optimized mapping for the at least one resource used to send data along the first communications path comprises:
   determining, by the rebalancer, an affinity between the at least one resource and a second resource; and
   generating, by the rebalancer, the resource optimized mapping based on the affinity between the at least one resource and the second resource.

13. The apparatus of claim 8, wherein the resource optimized mapping comprises instructions to alter a VNIC server failover configuration, wherein the VNIC server failover configuration identifies a backup VNIC server for use in response to a failure of the VNIC server.

14. The apparatus of claim 8, wherein the at least one resource comprises one selected from a group consisting of: a logical port, a communications adapter, a VNIC server, a virtual I/O server, processing resources, and memory resources.

15. A computer program product for automated dynamic load balancing across virtual network interface controller (VNIC) fast switchover devices, the computer program product disposed upon a non-transitory computer readable storage medium, the computer program product comprising computer program instructions that, when executed, cause a computer to carry out the steps of:

receiving, by a rebalancer, a notification that at least one resource used to send data along a first communications path through a hypervisor has exceeded a resource utilization threshold, the notification including at least one resource utilization metric, wherein the first communications path is utilized by a first client partition and comprises at least a VNIC client in the first client partition;

generating, by the rebalancer based on at least one resource utilization metric, a resource optimized mapping for the at least one resource used to send data along the first communications path; and issuing, by the rebalancer, the resource optimized mapping to the hypervisor, wherein the hypervisor reconfigures, based on the resource optimized mapping, the at least one resource used to send data along the first communications path.

16. The computer program product of claim 15, wherein the at least one resource is shared by a second communications path utilized by a second client partition.

17. The computer program product of claim 15, wherein the resource optimized mapping for the at least one resource used to send data along the first communications path comprises one selected from a group consisting of: an instruction to add an additional resource to the first communications path, and an instruction to replace the at least one resource with a second resource.

18. The computer program product of claim 15, further comprising detecting, by a resource monitor, that the at least one resource crosses the resource utilization threshold including:

detecting, by the resource monitor, that the at least one resource exceeds an upper resource utilization threshold; and detecting, by the resource monitor, that a second resource has fallen below a lower resource utilization threshold.

19. The computer program product of claim 15, wherein generating, by the rebalancer based on the at least one resource utilization metric, the resource optimized mapping for the at least one resource used to send data along the first communications path comprises:

determining, by the rebalancer, an affinity between the at least one resource and a second resource; and generating, by the rebalancer, the resource optimized mapping based on the affinity between the at least one resource and the second resource.

20. The computer program product of claim 15, wherein the resource optimized mapping comprises instructions to alter a VNIC server failover configuration, wherein the VNIC server failover configuration identifies a backup VNIC server for use in response to a failure of the VNIC server.

\* \* \* \* \*